(12) United States Patent
Dantzler, V

(10) Patent No.: US 7,685,045 B1
(45) Date of Patent: Mar. 23, 2010

(54) METHOD FOR MAXIMIZING DISCOUNT RATE STRUCTURE

(76) Inventor: Lorenzo N. Dantzler, V, 3000 S. Highway 77, Suite A, Lynn Haven, FL (US) 32444

(*) Notice: Subject to any disclaimer, the term of this patent is extended or adjusted under 35 U.S.C. 154(b) by 77 days.

(21) Appl. No.: 12/220,833

(22) Filed: Jul. 28, 2008

(51) Int. Cl.
*G06Q 40/00* (2006.01)
(52) U.S. Cl. .............................. 705/35; 705/39; 705/40
(58) Field of Classification Search ................. 705/35, 705/39, 40
See application file for complete search history.

(56) References Cited

U.S. PATENT DOCUMENTS

| 6,999,943 | B1 | 2/2006 | Johnson et al. |
| 2004/0024707 | A1 | 2/2004 | Perre et al. |
| 2007/0156580 | A1 | 7/2007 | Imrey et al. |

OTHER PUBLICATIONS

Transparent Financial Services at Tech Cocktail 7. (Press Release). Chicago. Feb. 23, 2008. < http://transfs.com/press/Transparent-Financial-Services-Presents-at-Tech-Cocktail-7/> (2 pages).*
Comparison Shopping for Small Business Financial Services. <http://web.archive.org/web/200806200054146/http:transfs.com/. Jun. 20, 2008 (2 pages)/.*

* cited by examiner

*Primary Examiner*—James P Trammell
*Assistant Examiner*—Elda Milef
(74) *Attorney, Agent, or Firm*—Peter Loffler

(57) ABSTRACT

A merchant financial transaction requiring authorization type batch processing system uses a bid system whereby two or more merchant processors bid on some or all of a batch of authorized financial transactions such that the merchant bidding the lowest discount rate structure for a give portion of a batch, processes the batch. If a portion of the batch or the entire batch receives no bids, a default merchant processor processes that portion or whole batch respectively.

9 Claims, 2 Drawing Sheets

METHOD FOR MAXIMIZING DISCOUNT RATE STRUCTURE

BACKGROUND OF THE INVENTION

1. Field of the Invention

The present invention relates to a system that maximizes the discount rate structure for merchants for financial transactions, either sales or credit transactions, that require an authorization including credit card transactions, debit card transactions, pre-paid credit card transactions, gift card transactions, electronic presentation of check transactions, and any other types of transactions that utilize a discount rate compensation method for the entity performing the processing of the financial transactions.

2. Background of the Prior Art

Financial transactions that utilize an authorization of the type just described are integral to the stream of commerce as billions of dollars worth of such transactions are processed on a daily basis. As seen in FIG. 1, this type of financial transaction begins with a sale (or credit). The appropriate credit instrument, credit card, debit card, pre-paid credit card, gift card, electronic presentation of a check, etc., is presented to the merchant, and the merchant obtains an approval code. If no approval code is granted (for example, the credit card is over limit, the gift card lacks a balance, etc.,), no approval code is given and no transaction occurs. If an approval code is given, the transaction is completed, and the financial transaction is added to a batch. At some point, with each transaction, hourly, daily, the number of transactions batched has reached a threshold, etc., the batch, consisting of all unsettled yet approved financial transactions is settled. The batch is submitted to a processor for processing of the transactions and funds are deposited into the merchant's account. At the end of each billing cycle, typically monthly, a fee is charged against the merchant's account by the entity performing the processing of the batches. This fee, which is often termed a discount rate, is a percentage of the entire dollar amount of the transactions processed in each batch during the billing cycle. The discount rate is typically made up of several components such as card qualified rate, card non-qualified rate, debit signature qualified rate, debit signature non-qualified rate, authorization fee, bill back fee, ACH fee (settlement charge), interchange fee, etc. As each one of these rates may be different, and as most batches trigger more than one of these rates, the term discount rate can be more properly called discount rate structure.

Processing occurs on a merchant computer or server or across a network.

For very large entities, such discount rate structures as negotiated with banks or other financial institutions as part of an overall elaborate intertwined relationship between merchant and financial transaction processing institution. Such negotiations are relatively sophisticated and are monitored regularly by merchant and institution alike. However, for smaller entities, such as the merchant that may have one or a handful of restaurants, such entities do not have the market presence to be able to wring the strongest deal possible from the financial transactions merchant processor. Typically, such merchants shop around local banks and other merchant processors to see who others the most favorable rate as predicted by the merchant for the types of transactions that the merchant expects to encounter. Once a merchant processor is selected, equipment and/or software is obtained from the processor, and the merchant conducts its business. Many business owners occasionally check their billing statements against competing merchant processors to see if a better discount rate structure can be obtained. If a merchant processor with a better rate structure is found, the merchant switches to the new processor, canceling the relationship with the old processor.

While such a merchant processor switch may be more profitable to the merchant, it may not be without problems. In many cases, new equipment and/or software needs to be obtained from the new processor and installed, often accompanied by one or more visits from the new processor's computer nerds. Additionally, as the discount rate is relatively complex, it may be difficult for a merchant to judge whether a potential new processor does indeed have a better discount rate structure relative to the existing processor, especially if the types of authorization transactions undertaken by the merchant evolve, with the attendant shift in the discount rate structure applied by a processor against the merchant's batches. Different transaction types, as well as different transaction sizes, result in different rate structures from a given merchant processor so that while a given merchant processor may appear to have the best discount rate structure for a merchant, the type and style of the merchant's transactions may not achieve the best discount rate structure from this merchant processor relative to the discount rate structure of another merchant processor.

What is needed is a system whereby a merchant without the market presence to negotiate favorable terms for merchant batch processing of financial transactions that require authorization can achieve the best available overall discount rate structure for the merchant's transactions without the need to manually monitor and analyze the various transactions conducted by the merchant and sent out to a merchant processor for batch settlement. Such a system must be relatively simple in design and implementation so as not to unduly burden the merchant nor require the employment of additional IT personnel.

SUMMARY OF THE INVENTION

The method for maximizing discount rate structure of the present invention addresses the aforementioned needs by providing a system whereby a merchant receives the best discount rate structure available for each approved financial transaction batch presented for settlement. The system, once implemented, is relatively transparent to the merchant and the merchant does not have to manually periodically analyze the merchant's recent transactions and available discount rate structures to verify that the maximum discount rate structure is being achieved. The system of the present invention can be set up as a not-for-profit cooperative that is owned and operated by the merchants that use the system which inures to the benefit of the merchants. While the system adds additional accounting work for the merchant by requiring the monitoring of multiple accounts, such work is more than offset by having lower discount rate structures via the use of the system.

The method for maximizing discount rate structure of the present invention comprises the steps of placing at least one financial transaction that has been authorized by a credit instrument into a batch. The batch is presented to a first merchant processor and at least one second merchant processor. The first merchant processor and the second merchant processor each place a respective discount rate structure bid on the batch. The merchant processor that bids the lowest discount rate structure for the batch has the batch forwarded to it for processing the batch. The batch is processed by a default merchant processor if neither the first merchant processor nor the second merchant processor place a discount rate structure on the batch. The batch is preprocessed for uniformity prior to being presented to the first merchant processor and the second merchant processor for bid. The credit instrument may be selected from the group comprising of a credit card, a debit card, a pre-paid credit card, a gift card, and an electronic presentment of a check. It may be that the first merchant processor places the lowest discount rate bid on a first portion of the batch and this first portion of the batch is forwarded to the first merchant processor for processing this first portion of the batch and the second merchant processor places the lowest discount rate bid on a second portion of the batch and this second portion of the batch is forwarded to the second merchant processor for processing this second portion of the batch. It may still further be that a third portion of the batch remains and is forwarded to the default merchant processor for processing this third portion of the batch. The financial transaction may be either a sales transaction or a credit transaction.

BRIEF DESCRIPTION OF THE DRAWINGS

Similar reference numerals refer to similar parts throughout the several views of the drawings.

DESCRIPTION OF THE PREFERRED EMBODIMENT

Figure 1:
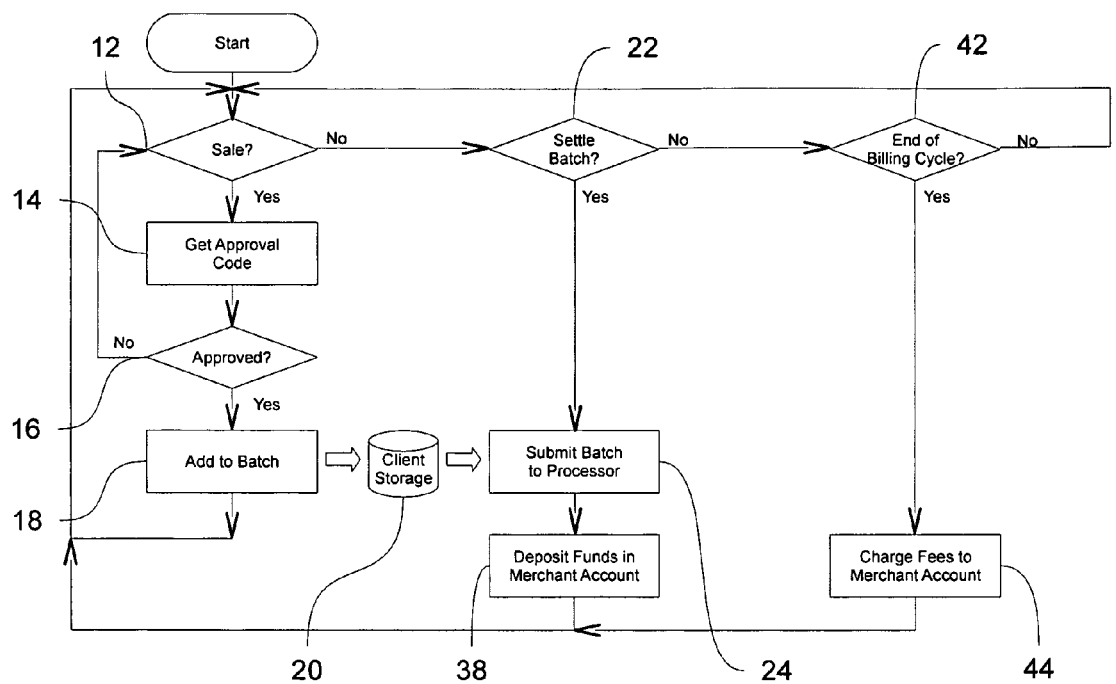
FIG. 1 is a schematic view of a typical financial transaction requiring authorization processing cycle.
Figure 2:
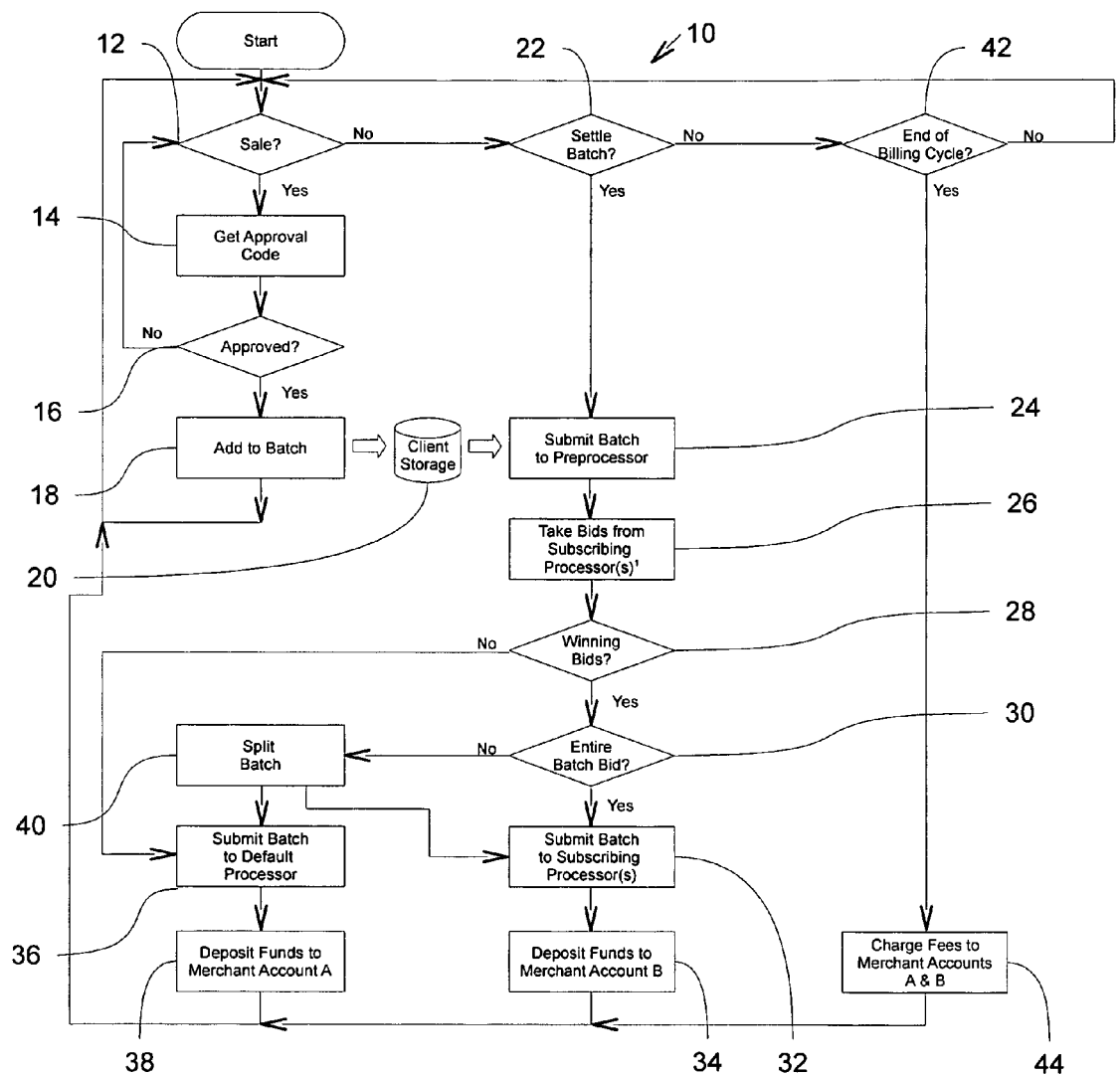
FIG. 2 is a schematic view of the method for maximizing discount rate structure of the present invention.

Referring now to the drawings, it is seen that the method for maximizing discount rate structure of the present invention, generally denoted by reference numeral 10, comprises a typical financial transaction requiring authorization processing system that employs the typical steps of having a sale 12 and getting an approval code 14. If no approval code 16 is obtained, the system returns to the initial point 12 awaiting the next sale to begin. If an approval code 16 is given, then the sale is completed and the financial transaction is added to a batch 18, which batch lies on the merchant's storage system 20.

When the appropriate time to settle the batch occurs 22, which may be after each transaction, or hourly, or daily or after a certain number of transactions occur, etc., the batch is sent to a preprocessor 24 wherein the batch is processed so as to be presented for settlement in a relatively uniform manner. Once the batch is ready for settlement, it is sent to a bid window 26 wherein two or more merchant processors bid on processing the batch such that the merchant with the lowest bid actually performs the settlement of the batch. A determination is made as to whether or not any winning bids have been made 28 by the competing merchant processors. If a merchant processor does successfully bid on some or all of the batch, then a determination is made as to whether the winning merchant bid on the entire batch or just a sub-set of the batch 30 (for example, the merchant processor may have bid to settle only the credit card transactions within the batch). If the merchant processor bid on the entire batch, then the batch is submitted to this merchant processor for processing 32, and once the merchant processor processes the batch, the merchant processor deposits the funds to a first account of the merchant 34 in the typical way, and the system 10 resets back to await another sale 12. If at the bid window 26, no winning bids are placed on the batch, then the batch is sent to a default merchant processor 36, which processor processes the entire batch and deposits funds into a second account of the merchant 38, and the system 10 resets back to await another sale 12. If there is a winning bid at the bid window 26, yet the entire batch is not bid on 32, then the batch is sent to be split 40 with the portion of the batch that was won by a merchant processor at the bid window 26 being sent to the winning merchant processor for processing 34, and once the merchant processor processes the batch, the merchant processor deposits the funds to the first merchant account 36 in the typical way. The portion of the batch that had no winning bid at the bid window 26 is sent to the default merchant processor 36, which processor processes the entire batch and deposits funds into the second account of the merchant 38. Thereafter, the system 10 resets back to await another sale 12.

At the bid window 26 more than one merchant processor may having a winning bid so that some portion of the batch is won by a first merchant processor and some portion of the batch is won by a second merchant processor (for example, the first merchant processor may have successfully bid on the credit card transactions portion of the batch, while the second merchant processor may have successfully bid on the debit card transactions portion of the batch), and yet still, some portion of the batch is not won and is processed by the default merchant processor. The default merchant processor may also be a subscribing merchant processor, in that the default merchant processor may also bid on the various batches that appear for bid at the bid window 26.

Any transactions that do not benefit from a bid, such as voids, preauthorized transactions, etc., are routed accordingly by the system 10.

The system 10 works for any type of financial transaction requiring an authorization including a sales transaction, a credit transaction, etc.

At the end of the billing cycle 42, the accounts are settled such that the winning bid merchant processors charge the appropriate discount rate structure to the first account of the merchant and the default merchant processor charges its discount rate structure fee to the second merchant account 44.

The system 10 can be performed entirely on the merchant's computer or server or across a network, be it the Internet, an intranet, etc. As the entire system is computerized, there is no need for the merchant to manually scrutinize the various merchant statements received and compare such statements discount rate structures being offered by various merchants.

While the invention has been particularly shown and described with reference to an embodiment thereof, it will be appreciated by those skilled in the art that various changes in form and detail may be made without departing from the spirit and scope of the invention.

I claim:

1. A processing method for settling transactions comprising the steps of:
    placing at least one financial transaction that has been authorized by a credit instrument into a batch;
    electronically presenting the batch to a first merchant processor and a second merchant processor;
    having the first merchant processor and the second merchant processor place a discount rate structure bid on the batch; and
    electronically selecting from among the first merchant processor and the second merchant processor that bids the lowest discount rate structure for the batch and forwarding the batch to the merchant processor selected for processing the batch.

2. The method as in claim 1 wherein the batch is processed by a default merchant processor if neither the first merchant processor nor the second merchant processor place a discount rate structure on the batch.

3. The method as in claim 1 wherein the batch is preprocessed for uniformity prior to being presented to the first merchant processor and the second merchant processor.

4. The method as in claim 1 wherein the credit instrument is selected from the group consisting of a credit card, a debit card, a pre-paid credit card, a gift card, and an electronic presentment of a check.

5. The method as in claim 1 wherein the first merchant processor places the lowest discount rate bid on a first portion of the batch and the first portion of the batch is forwarded to the first merchant processor for processing the first portion of the batch and the second merchant processor places the lowest discount rate bid on a second portion of the batch and the second portion of the batch is forwarded to the second merchant processor for processing the second portion of the batch.

6. The method as in claim 5 wherein a third portion of the batch remains and is forwarded to a default merchant processor for processing the third portion of the batch.

7. The method as in claim 1 wherein the financial transaction is a sales transaction.

8. The method as in claim 1 wherein the financial transaction is a credit transaction.

9. The method as in claim 1 wherein the financial transaction is either a sales transaction or a credit transaction.

* * * * *